United States Patent
Liu et al.

(10) Patent No.: US 8,605,905 B2
(45) Date of Patent: Dec. 10, 2013

(54) SYSTEM AND METHOD FOR SECURING WIRELESS TRANSMISSIONS

(75) Inventors: Tie Liu, Sugar Land, TX (US); Yufei Blankenship, Kildeer, IL (US)

(73) Assignee: FutureWei Technologies, Inc., Plano, TX (US)

( * ) Notice: Subject to any disclaimer, the term of this patent is extended or adjusted under 35 U.S.C. 154(b) by 322 days.

(21) Appl. No.: 12/871,574

(22) Filed: Aug. 30, 2010

(65) Prior Publication Data

US 2012/0051544 A1 Mar. 1, 2012

(51) Int. Cl.
*H04L 29/06* (2006.01)

(52) U.S. Cl.
USPC .......................................................... 380/270

(58) Field of Classification Search
USPC .......................................................... 380/270
See application file for complete search history.

(56) References Cited

U.S. PATENT DOCUMENTS

| | | | |
|---|---|---|---|
| 6,314,188 B1* | 11/2001 | Ishibashi | 380/201 |
| 2008/0130890 A1* | 6/2008 | Rigler | 380/259 |
| 2010/0041389 A1* | 2/2010 | Cave et al. | 455/423 |
| 2010/0246812 A1* | 9/2010 | Rane et al. | 380/28 |

OTHER PUBLICATIONS

Cai, N., et al., "Secure Network Coding on a Wiretap Network," IEEE Transactions on Information Theory, vol. 57, No. 1, Jan. 2011, pp. 424-435.

Csiszar, I., et al., "Broadcast Channels with Confidential Messages," IEEE Transactions on Information Theory, vol. IT-24, No. 3, May 1978, pp. 339-348.

Chia, Y-K., et al., "3-Receiver Broadcast Channels with Common and Confidential Messages," arXiv:0910.1407v3 [cs.IT], Nov. 7, 2009, 35 pages.

Li, Z., et al., "Secrecy Capacity of Independent Parallel Channels," Forty-Fourth Annual Allerton Conference, Sep. 27-29, 2006, pp. 841-848.

Liang, Y., et al. "Compound Wire-tap Channels," $45^{th}$ Annual Allerton Conference on Communication, Control, and Computing, Sep. 2007, 12 pages.

Ly, H.D., et al., "Security Embedding Codes," IEEE International Symposium on Information Theory (ISIT), Jun. 13-18, 2010, 5 pages.

Shannon, C.E., "Communication Theory of Secrecy Systems," A Mathematical Theory of Cryptography, Sep. 1, 1946, 60 pages.

\* cited by examiner

*Primary Examiner* — Michael S McNally
(74) *Attorney, Agent, or Firm* — Slater & Matsil, L.L.P.

(57) ABSTRACT

A system and method for securing wireless communications are provided. A method for transmitting a message by a transmitter includes partitioning the message into N sub-messages, where N is a positive integer value greater than or equal to two, encoding the N sub-messages into a plurality of packet groups with a first security code, encoding the plurality of packet groups into a plurality of output packets with a second security code, and transmitting the plurality of output packets.

21 Claims, 8 Drawing Sheets

SYSTEM AND METHOD FOR SECURING WIRELESS TRANSMISSIONS

TECHNICAL FIELD

The present invention relates generally to wireless communications, and more particularly to a system and method for securing wireless communications.

BACKGROUND

In general, securing transmitted information typically involves the application of a security technique to make it difficult if not impossible for an eavesdropper to detect the actual information content of a transmission made to a legitimate receiver. Normally, security may be provided in higher layers of a network, such as in an application layer, wherein a security application may be used to apply the security to the information content of the transmission prior to the actual transmission taking place. For example, the security application may be a program executed by a user who wishes to secure the transmission. Alternatively, the security application may be a hardware security unit that may be used to secure transmissions made by a transmitter used by the user.

However, the higher layer security techniques may usually require that a secret key(s) be shared by a transmitter (the user) and a receiver (the legitimate receiver). Sharing the secret key(s) may be problematic since the security of the security techniques may only be as good as the security present in the sharing of the secret key(s).

SUMMARY OF THE INVENTION

These and other problems are generally solved or circumvented, and technical advantages are generally achieved, by preferred embodiments of the present invention which provide a system and method for securing wireless communications.

In accordance with a preferred embodiment of the present invention, a method for transmitting a message is provided. The method includes partitioning the message into N sub-messages, where N is a positive integer value greater than or equal to two, encoding the N sub-messages into a plurality of packet groups with a first security code, encoding the plurality of packet groups into a plurality of output packets with a second security code, and transmitting the plurality of output packets.

In accordance with another preferred embodiment of the present invention, a method for receiving a message is provided. The method includes receiving a secure transmission that includes L vectors of received signals, where L is an integer greater than one, generating an intermediate secure codeword from each vector of received signals in the L vectors of received signals using a second security code, thereby producing a plurality of intermediate secure codewords, and reconstructing the message from the plurality of intermediate secure codewords, wherein the reconstructing is based on a first security code.

In accordance with another preferred embodiment of the present invention, a transmitter is provided. The transmitter includes a scheduler, a security unit coupled to the scheduler, a security code store coupled to the security unit, and a transmit circuit coupled to the security unit. The scheduler arranges a timing of transmission of messages to a receiver, the secure code store stores the secure network code and the security embedding code, and the transmit circuit prepares the L output codewords for transmission. The security unit secures a message provided by the scheduler by generating L output codewords from the message using a secure network code and security embedding code. The message is partitioned into at least two sub-messages before encoding, the secure network code is used to encode the at least two sub-messages, and the security embedding code is used to encode an output produced by encoding the at least two sub-messages with the secure network code.

An advantage of an embodiment is that security may be achieved even when, on average, a channel between the transmitter and an eavesdropper is equivalent or even better than a channel between the transmitter and a legitimate receiver.

A further advantage of an embodiment is that by spreading information bits over multiple transmissions that are transmitted independently of each other, security may be maintained even if the eavesdropper intercepts up to a determined number of transmissions. The determined number of transmissions may be a design parameter of the security system and may be adjusted depending on desired security level, data rate, and so on.

A further advantage of an embodiment is that an inherent randomness at the source and the communications channel may be exploited to secure communications between a transmitter and a receiver. Therefore, a secret key may not need to be shared, which may enhance the overall security of the security system.

Yet a further advantage of an embodiment is that a different level of security may be provided to information of different importance. Therefore, a higher level of security may be given to higher importance information, while lower importance information may be given a lower security level.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with multiple receivers, at least one of which is a legitimate receiver and at least one of which is an eavesdropper, such as a Third Generation Partnership Project Long Term Evolution (3GPP LTE) compliant communications system, a WiMAX compliant communications system, or so forth.

Figure 1:
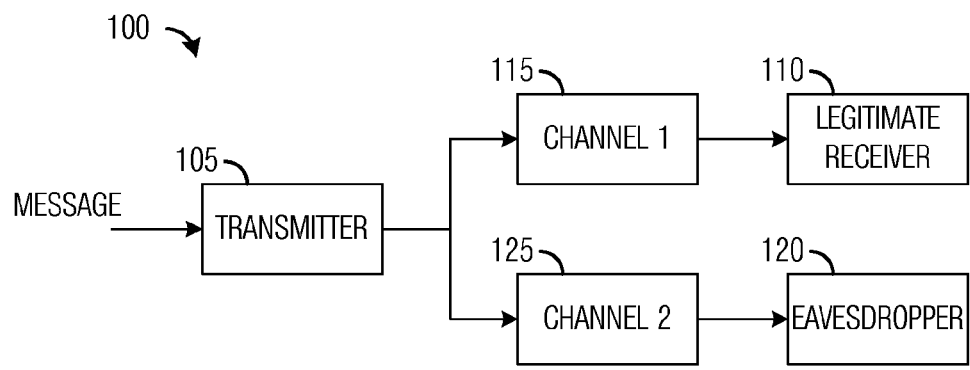
FIG. 1 is a diagram of a wiretap channel model.

FIG. 1 illustrates a wiretap channel model 100. Wiretap channel model 100 includes a transmitter 105 that transmits a message (information) to a legitimate receiver 110 over a first communications channel (channel 1) 115. However, due to a broadcast nature of wireless communications, an eavesdropper 120 may also receive the message over a second communications channel (channel 2) 125. First communications channel 115 may be referred to as a legitimate channel, while second communications channel 125 may be referred to as an eavesdropper channel.

Fading is a fundamental nature of wireless communications. Radios from multiple transmission paths add constructively or destructively at the receiver, leading to a time-varying channel, for example, when either a transmitter or a receiver is in motion. An often-adopted model in design and analysis is a so-called block fading model, in which the channel is assumed to be constant within each coherent period and changes independently from one coherent period to another.

In standard communications without secrecy constraints, fading may be very detrimental, particularly when channel state information (CSI) is not available at the transmitter. However, when CSI is known at the transmitter, CSI may be utilized to boost the performance of the communications.

Figure 2:
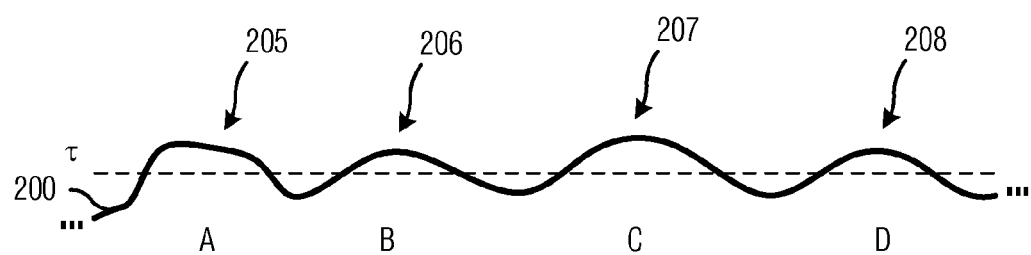
FIG. 2 is a diagram of a channel gain curve of a legitimate channel used to transmit multiple secure messages.

FIG. 2 illustrates a channel gain curve 200 of a legitimate channel used to transmit multiple secure messages. Channel gain may be an indicator of a channel's quality. As shown in FIG. 2, channel gain may vary, increasing and decreasing, over time. At certain times, such as times corresponding to peaks 205 through 208, channel gain curve 200 may exceed a threshold $\tau$ (shown as dashed line).

The threshold $\tau$ may be used to ensure that a transmission to the legitimate receiver occurs when the legitimate channel is at or near its peak quality. In general, if the quality of the legitimate channel is better than the quality of the eavesdropper channel when the transmission is made, secrecy codes may be used to protect transmission from being eavesdropped by the eavesdropper. On the other hand, if the quality of the legitimate channel is lower than the quality of the eavesdropper channel when the transmission is made, the eavesdropper may be able to intercept the transmission made on the legitimate channel. Since the transmitter may not have knowledge of the eavesdropper channel, the threshold $\tau$ may be set high to help ensure that the transmitter transmits only when quality of the legitimate channel is high and more likely to be better than the quality of the eavesdropper channel.

A simple technique to harness the fading nature of the channel may involve first partitioning a message into several fragments, such as data packets. Since no coding is involved in the partitioning of the message into several packets, a secrecy rate $R_s$ is the same as a transmission rate R of each packet, i.e., $$R = R_s. \tag{1}$$

Each of the packets may then be encoded using a secrecy code, which preferably is a secrecy-capacity-achieving secrecy code. Then, based on an indicator of the quality of the legitimate channel, such as channel state information (CSI), the transmitter may send the encoded packets when the legitimate channel gain exceeds the threshold $\tau$ (i.e., a peak)

Suppose that secrecy-capacity-achieving codes are used, then each encoded packet that is transmitted is secure if and only if $$\log\left(1 + \frac{Pg_E}{N_0}\right) < \log\left(1 + \frac{P\tau}{N_0}\right) - R_s,$$

where $g_E$ is the channel gain of the eavesdropper channel at the time of transmission, $N_0$ is the power of the background noise, and P is the transmit power. Therefore, an interception probability $p_{INT}$ of the transmitted encoded packet may be expressed as $$p_{INT} = 1 - (1-p_0)^L, \tag{2}$$

where L is a number of peaks used for transmission, and $p_0$ is an interception probability for each transmitted encoded packet and may be expressed as $$p_0 = Pr\left(\log\left(1 + \frac{Pg_E}{N_0}\right) \geq \log\left(1 + \frac{P\tau}{N_0}\right) - R_s\right). \tag{3}$$

In a co-assigned patent application entitled "System and Method for Securing Wireless Transmissions," filed Feb. 26, 2010, application Ser. No. 12/714,095, which is incorporated herein by reference, a technique for further reducing the interception probability (as shown in Equation (2)) is provided. In the co-assigned patent application, in addition to transmitting individual packets of a message over multiple peaks, the message is first encoded using a secure network code(s), which may help to ensure the security of the message despite a possible interception of some of the individual packets.

For discussion purposes, suppose that a K-out-of-L secure network code, wherein secrecy is ensured if K or fewer out of L packets are intercepted by an eavesdropper, is used to encode the message, a transmission rate R of each packet may be expressed as $$R = \frac{L}{L-K} R_s. \quad (4)$$

Therefore, the larger the parameter K, the stronger the secure network code. However, larger values of K incur a greater rate penalty. Once the packets are formed, each packet may be encoded separately using a secrecy code (preferably a secrecy-capacity-achieving code). In general, a secrecy-capacity-achieving code may be a secrecy code optimized to achieve a highest possible secrecy rate. An example of a secrecy-capacity-achieving code may be a binning code with an appropriate codebook. Then, as discussed above, each time a peak is detected in the legitimate channel gain (i.e., an indicator of the channel quality exceeds a threshold τ) a packet is transmitted.

The use of both the secure network code and a secrecy code may help to ensure that the message remains secure as long as no more than K packets are intercepted by the eavesdropper. The technique is also referred to as a "coding-over-the-peaks" scheme. Suppose that a secrecy-capacity-achieving code is used, then an interception probability $p_{INT}$ of the transmit message may be expressed as $$p_{INT} = \sum_{k=K+1}^{L} \binom{L}{k} p_0^k (1-p_0)^{L-k}, \quad (5)$$

where $p_0$ is the interception probability for each data packet and is expressible as $$p_0 = Pr\left(\log\left(1 + \frac{Pg_E}{N_0}\right) \geq \log\left(1 + \frac{P\tau}{N_0}\right) - \frac{L}{L-K} R_s\right). \quad (6)$$

If K=0, then Equations (5) and (6) reduce to corresponding Equations (2) and (3). However, if K is chosen appropriately, then the interception probability $p_{INT}$ (Equation (5)) may be substantially reduced when compared to Equation (2).

Figure 3A:
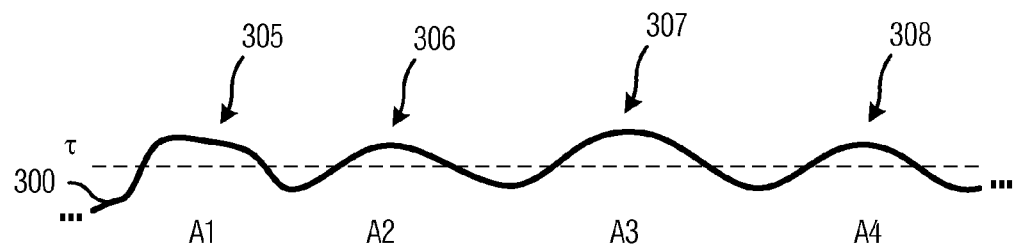
FIG. 3a is a diagram of a channel gain curve of a legitimate channel used to transmit multiple packets of a single message, wherein the packets are encoded with a secure network code and a secrecy code.

FIG. 3a illustrates a channel gain curve 300 of a legitimate channel used to transmit multiple packets of a single message, wherein the packets are encoded with a secure network code and a secrecy code. Channel gain may be an indicator of a channel's quality. As shown in FIG. 3a, channel gain curve 300 may vary, increasing and decreasing over time. At certain times, such as times corresponding to peaks 305 through 308, channel gain curve 300 may exceed a threshold τ (shown as dashed line). Each peak corresponds to a time when the transmitter may be able to transmit an output codeword of the secure message. For example, at peak 305 the transmitter may transmit a first packet of secure message A (shown as message A1), at peak 306 the transmitter may transmit a second packet of secure message A (shown as message A2), and so forth.

Figure 3B:
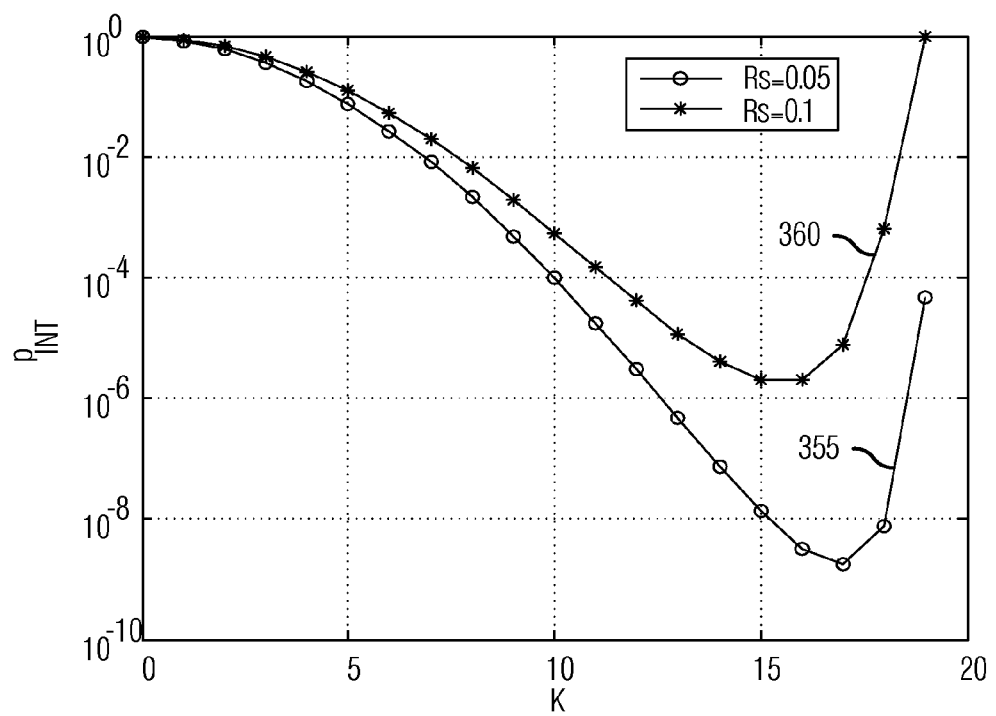
FIG. 3b is a diagram of a plot of interception probability $p_{INT}$ versus K for several secrecy rates $R_s$.

FIG. 3b illustrates a plot of interception probability $p_{INT}$ versus K for several secrecy rates $R_s$. A first curve 355 corresponds to interception probabilities versus K for a secrecy rate of 0.05 and a second curve 360 corresponds to interception probabilities versus K for a secrecy rate of 0.10. As shown in FIG. 3b, the addition of secure network coding may substantially reduce the interception probability of secure wireless communications.

According to an embodiment, it may be possible to boost the secrecy rate of a message by replacing regular secrecy codes used to encode each of the packets with security embedding codes, a realization of which may be nested binning codes. A function of a security embedding code may be to simultaneously encode two messages facing two eavesdroppers, wherein a first of the two messages may be a high-security message that is secure against both eavesdroppers and a second of the two messages may be a low-security message that is secure only against a weaker of the two eavesdroppers.

An interesting property of the security embedding code is that there is zero sum-rate loss when compared with a regular secrecy code facing only the weaker of the two eavesdroppers. In other words, by simply designing the secrecy codes carefully, part of the transmitted message may be given extra protection against a stronger eavesdropper.

Figure 4A:
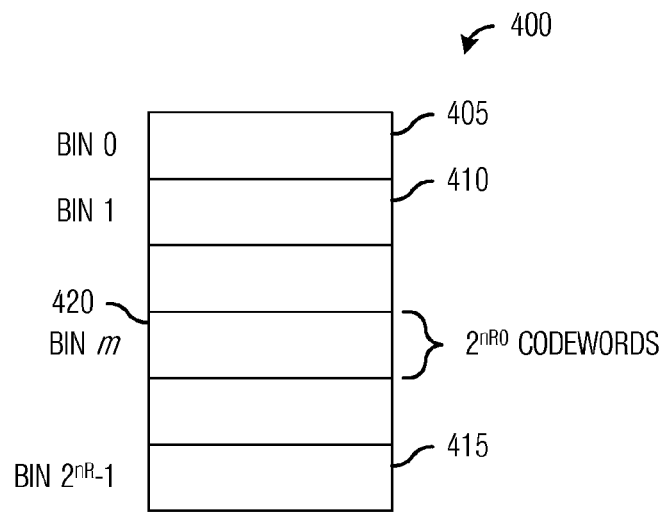
FIG. 4a is a diagram of a structure of a binning code.

FIG. 4a illustrates a structure 400 of a binning code. Structure 400 includes $2^{nR}$ bins, such as bin "0" 405, bin "1" 410, and bin "$2^{nR}-1$" 415, with each bin corresponding to one of the $2^{nR}$ possible messages. Each of the $2^{nR}$ bins comprises a sub-codebook of $2^{nR_0}$ codewords. The sub-codebooks in each of the $2^{nR}$ bins have a rate of $R_0$, which needs to be high enough to confuse the eavesdropper. However, a rate of the entire codebook (the binning code) $R_0+R$ may not exceed the capacity of the communications channel between the transmitter and the legitimate receiver (e.g., first communications channel 115).

In the binning code shown in FIG. 4a, each possible message is associated with a bin of multiple codewords. For each possible message, an encoder may randomly select a codeword from the corresponding bin and transmit it to the legitimate receiver over the communications channel. For example, a possible message m may correspond to bin "m" 420. The encoder may select at random one of $2^{nR_0}$ codewords from bin "m" 420 to transmit to the legitimate receiver.

The randomness is intrinsic to the transmitter and may not be shared with either the legitimate receiver or the eavesdropper. The number of codewords in each bin represents an amount of artificial randomness injected into the communications channel. When combined with the natural randomness present in the communications channel between the transmitter and the eavesdropper, the artificial randomness needs to be sufficient to fully confuse the eavesdropper.

In order to ensure reliability at the legitimate receiver and secrecy at the eavesdropper, the codebook (the binning code) should be chosen such that:

For each possible received signal and in each of the bins, there is (at least) one codeword that will confuse the eavesdropper of the transmitted codeword. Therefore, the eavesdropper has no idea which bin the transmitted codeword belongs to and hence is completely confused about the information that was transmitted.

The codewords from all bins together form a channel code that may be reliably decoded by the legitimate receiver.

The information rate R of a binning code may be given by a difference between a rate of the entire codebook and a rate $R_0$ of the sub-codebook in each bin. To maximize the information rate, the entire codebook should be a good channel code with a high rate and the sub-codebooks in each bin should be good confusion codes with low rate. Practical constructions of good binning codes may be based on low density parity check (LDPC) codes and other good linear block codes.

Since the quality of the communications channel between the transmitter and the eavesdropper is unknown, in order to guarantee secrecy it may be necessary to design a binning code based on the worst possible scenario, namely a best possible realization of the communications channel between the transmitter and the eavesdropper. However, the guarantee may come at the expense of squandering opportunities when the communications channel between the transmitter and the eavesdropper is not close to the best possible realization. Nested binning codes may help to overcome problems associated with always guaranteeing secrecy in the best possible realization of the communications channel between the transmitter and the eavesdropper.

Figure 4B:
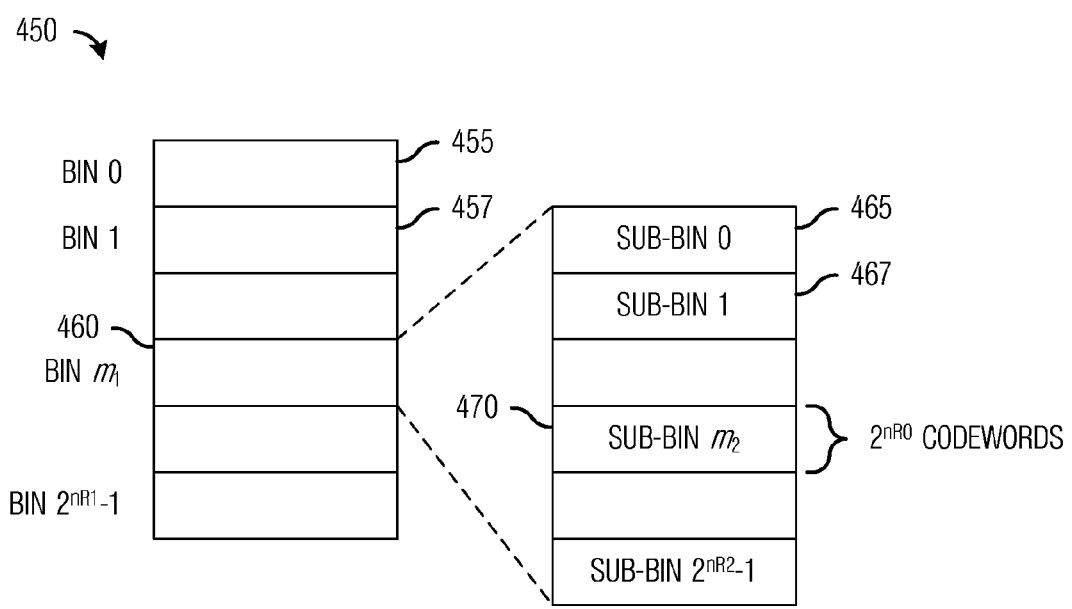
FIG. 4b is a diagram of a structure of a nested binning code for use in transmitting two messages.

FIG. 4b illustrates a structure 450 of a nested binning code for use in transmitting two messages. For discussion purposes, let there be two messages $M_1$ and $M_2$ to be transmitted, where message $M_1$ is more crucial than message $M_2$ from a security view point, meaning that it is more important to ensure secrecy of message $M_1$ than message $M_2$. Although the discussion focuses on protecting two messages with a nested binning code, in general, nested binning codes of the structure disclosed herein may be extended to protect an arbitrary number of messages, such as two, three, four, five, and so forth. Therefore, the discussion of protecting two messages should not be construed as being limiting to either the scope or the spirit of the embodiments. Furthermore, although the discussion focuses on two messages, a single message may be partitioned into two sub-messages or in general, multiple sub-messages.

Structure 450 includes $2^{nR_1}$ bins, such as bin "0" 455 and bin "1" 457, with each bin corresponding to one of the possible messages of message $M_1$, where $R_1$ is the code rate of message $M_1$. Each of the $2^{nR_1}$ bins may then be further partitioned into $2^{nR_2}$ sub-bins, for example, bin "$m_1$" 460 comprises $2^{nR_2}$ sub-bins, such as sub-bin "0" 465 and sub-bin "1" 467, with each sub-bin corresponding to one of $2^{nR_2}$ possible messages of message $M_2$, where $R_2$ is the code rate of message $M_2$. Each of the sub-bins may contain $2^{nR_0}$ codewords, for example, sub-bin "$m_2$" 470 contains $2^{nR_0}$ codewords.

Each possible message $m_1 \in \{0, 1, \ldots, 2^{nR_1}-1\}$ corresponds to a bin, and within each bin, each possible message $m_2 \in \{0, 1, \ldots, 2^{nR_2}-1\}$ corresponds to a sub-bin, where each sub-bin is composed of $2^{nR_0}$ codewords. Therefore, each sub-bin in structure 450 may be indexed by a message pair $(m_1, m_2)$.

A rate $R_0$ of the sub-codebooks in each sub-bin may need to be high enough to confuse the eavesdropper when the communications channel realization for the eavesdropper is weak. However, a rate $R_0+R_2$ of the sub-codebooks in each bin may need to be high enough to confuse the eavesdropper when the communications channel realization for the eavesdropper is strong. A rate of the entire codebook (structure 450) $R_0+R_1+R_2$ may not exceed the capacity of the communications channel between the transmitter and the legitimate receiver.

Figure 5A:
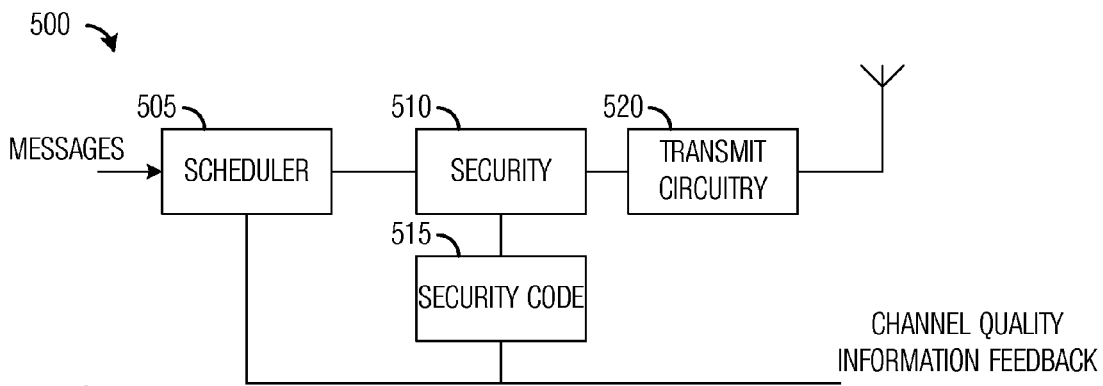
FIG. 5a is a diagram of a portion of a transmitter with physical layer security.

FIG. 5a illustrates a portion of a transmitter 500 with physical layer security. Messages, in the form of bits, symbols, or packets, for example, destined for a plurality of receivers served by transmitter 500 may be sent to a scheduler 505, which decides which message(s) to which receiver(s) should be transmitted in a given transmission opportunity. Messages for receivers selected to receive transmissions may be provided to a security unit 510 which may provide physical layer security by coding each of the messages using a secrecy code, where the secrecy code comprises a first security code and a second security code, wherein one of the security codes is a security embedding code.

In general, the operation of security unit 510 may be described as a multi-phase operation to provide security for a message. According to an embodiment, in a first phase, a message with secrecy rate $R_s$ may be divided into two sub-messages. The two sub-messages (e.g., $M_1$ and $M_2$) have secrecy rates $R_s^{(1)}$ and $R_s^{(2)}$, respectively. A relationship between $R_s$, $R_s^{(1)}$, and $R_s^{(2)}$ may be expressible as $$R_s^{(1)} + R_s^{(2)} = R_s. \quad (7)$$

The two sub-messages may be encoded into a total of L segments of coded bits using different first security code (e.g., a secure network code). For example, a first sub-message $M_1$ may be encoded into L packets using an instance of the first security code, and a second sub-message $M_2$ may be encoded into L packets using the different first security codes, where L is a positive integer value. Furthermore, let $K_1$ and $K_2$ be two positive integer values such that $$K_1 \le K_2 \le L. \quad (8)$$

Therefore, first sub-message $M_1$ may be encoded into L packets using a $K_1$-out-of-L first security code and second sub-message $M_2$ may be encoded into L packets using a $K_2$-out-of-L first security code. Due to the relationship between $K_1$ and $K_2$ shown in Equation (8), first sub-message $M_1$ may have been encoded using a weaker first security code than second sub-message $M_2$.

Packets generated from first sub-message $M_1$ may have a transmission rate of $$R^{(1)} = \frac{L}{L-K_1} R_s^{(1)}. \quad (9)$$

Similarly, packets generated from second sub-message $M_2$ may have a transmission rate of $$R^{(2)} = \frac{L}{L-K_2} R_s^{(2)}. \quad (10)$$

As shown in Equations (8) through (10), the encoding of first sub-message $M_1$ may incur a smaller rate loss than the encoding of second sub-message $M_2$.

According to an embodiment, in a second phase, the packets generated from the first sub-message $M_1$ and from the second sub-message $M_2$ may then be grouped into L pairs of packets, preferably with each of the L pairs of packets consisting of one packet from the first sub-message $M_1$ and one packet from the second sub-message $M_2$.

Each of the L pairs of packets may then be encoded using a second security code, e.g., a security embedding code (such as a nested binning code). Preferably, the packet from the first sub-message $M_1$ may be encoded as a high-security message, while the packet from the second sub-message $M_2$ may be encoded as a low-security message.

Then one of the L pairs of packets after encoding with the second security code may be transmitted to a destination each time the legitimate receiver channel gain exceeds the threshold $\tau$, i.e., during a peak.

From Equations (7), (9), and (10), it may be shown that the secrecy rate of the message is related to the transmission rates of the packets as $$R_s = \frac{L-K_1}{L} R^{(1)} + \frac{L-K_2}{L} R^{(2)}. \quad (11)$$

Therefore, if $K_1 = K_2 = K$ and $R^{(1)} + R^{(2)} = R$, then Equations (8) through (10) simplify to Equations (4) through (6). However, the secrecy rate $R_s$ may be improved by choosing a smaller $K_1$.

Let $K_2=K$ and $R^{(1)}+R^{(2)}=R$ so that the security level of the message $M_2$ will remain as the previously described "coding-over-the-peaks" scheme. Let the first sub-message $M_1$ receive stronger protection from the second security code (i.e., the security embedding code). Therefore, in order to maintain the same security level, $K_1<K$ may be chosen in the first security code (i.e., the secure network code) to improve the overall secrecy rate $R_s$ as in Equation (11).

From the property of security embedding codes, the interception probability $p_{INT}^{(1)}$ of the first sub-message $M_1$ may be expressed as $$p_{INT}^{(1)} = \sum_{k=K_1+1}^{L} \binom{L}{k} p_1^k (1-p_1)^{L-k}, \quad (12)$$

where $p_1$ is the interception probability of each packet generated from the first sub-message $M_1$ and is expressible as $$p_1 = Pr\left(\log\left(1+\frac{Pg_E}{N_0}\right) \geq \log\left(1+\frac{P\tau}{N_0}\right) - R^{(1)}\right). \quad (13)$$

In order to match the interception probability $p_{INT}$ as shown in Equations (5) and (6), $R^{(1)}$ and $K_1$ may be chosen jointly so that $$p_{INT}^{(1)} = p_{INT}. \quad (14)$$

Potentially, there are many pairs of $R^{(1)}$ and $K_1$ for which Equation (14) may be satisfied. Therefore, one pair of ($R^{(1)}$ and $K_1$) may be chosen to maximize the secrecy rate $R_s$ and may be expressed as $$R_s = \frac{K_2-K_1}{L} R^{(1)} + \frac{L-K}{L} R. \quad (15)$$

The term $$\frac{K_2-K_1}{L} R^{(1)}$$

may be the increase of the secrecy rate relative to the previously described "coding-over-the-peaks" scheme.

The first and the second security codes used by security unit 510 are also known at the legitimate receiver. The first and the second security codes used in security unit 510 may be stored in a security code store 515. In addition to deciding which messages to which receivers should be transmitted, scheduler 505 may schedule the transmission of the L output codewords of the message based on channel state information (explicit or implicit) of the legitimate channel. According to an embodiment, the channel state information of the legitimate channel may be explicitly fedback by the legitimate receiver, either specifically for security purposes or part/all of feedback to be also used for other purposes, or implicitly known at the transmitter.

After the L codewords of the message have been secured and then scheduled, transmit circuitry 520 may be used to process the L output codewords for transmission. Operations performed by transmit circuitry 520 may include conversion to an analog representation of the selected codeword, filtering, amplifying, interleaving, coding and modulating, beam forming, and so forth. Some of the operations performed by transmitter 500, such as secrecy coding, beam forming, and so on, may make use of channel quality feedback information provided by receivers served by transmitter 500. The representation of the communications channel may also be used by scheduler 505 in its selection of the receivers.

Figures 1, 5B:
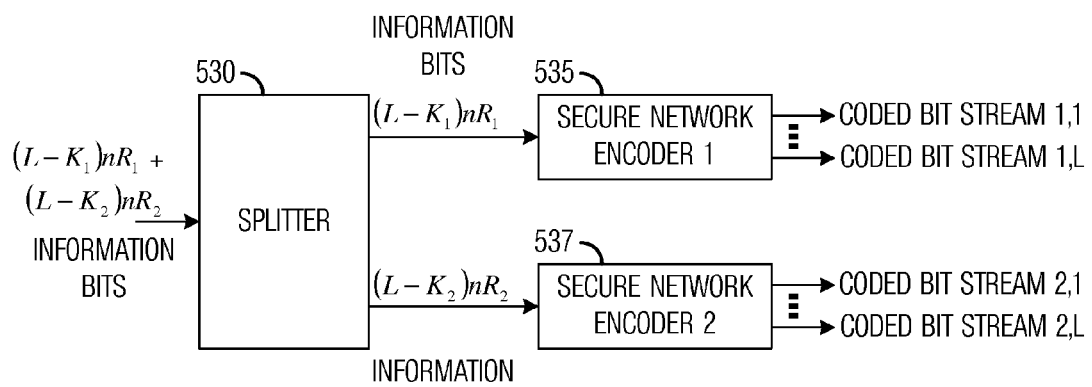
FIG. 5b is a diagram of a detailed view of an encoder with physical layer security.
Figures 2, 5B:
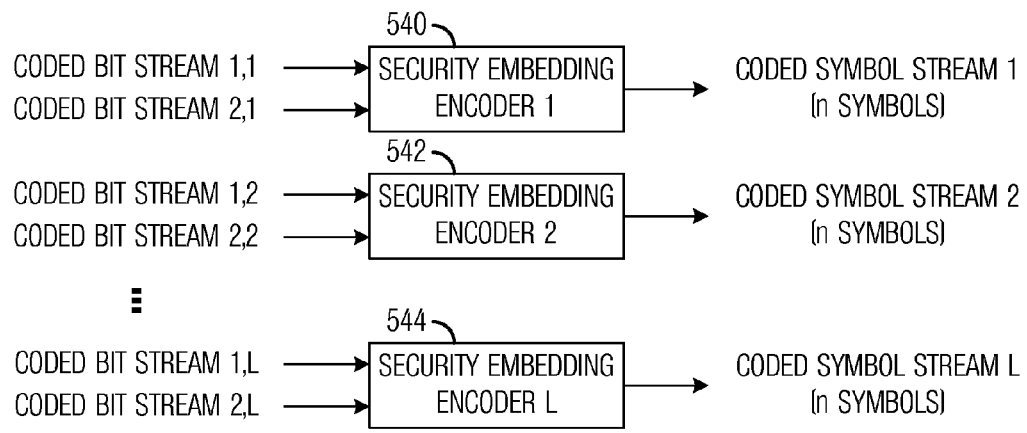

FIG. 5b illustrates a detailed view of an encoder with physical layer security. FIG. 5b may be illustrated as two parts, FIG. 5b-1 and FIG. 5b-2, with FIG. 5b-1 illustrating a detailed view of a first portion of the encoder and FIG. 5b-2 illustrating a detailed view of a second portion of the encoder.

As shown in FIG. 5b-1, the first portion of the encoder may encode information bits with a first security code, e.g., a secure network code. A splitter 530 may split the information bits into N sub-messages (in FIG. 5b-1, the information bits are split into two sub-messages). The N sub-messages may then be provided to N secure network code encoders, such as secure network encoder 1 535 and secure network encoder 2 537. Each secure network encoder may produce as output L streams of coded bits.

As shown in FIG. 5b-2, the second portion of the encoder may encode the N*L streams of coded bits produced by the N secure network code encoders into L streams of coded symbols. The second portion of the encoder may include L security embedding code encoders, such as security embedding encoder 1 540, security embedding encoder 2 542, and security embedding encoder L 544. Input to each of the security embedding encoder may be a coded bit stream from each of the L output streams of coded bits, then each of the security embedding encoders may produce a stream of coded symbols. For a string of information bits shown in FIG. 5b-1, a security embedding encoder may produce n symbols.

Figure 5C:
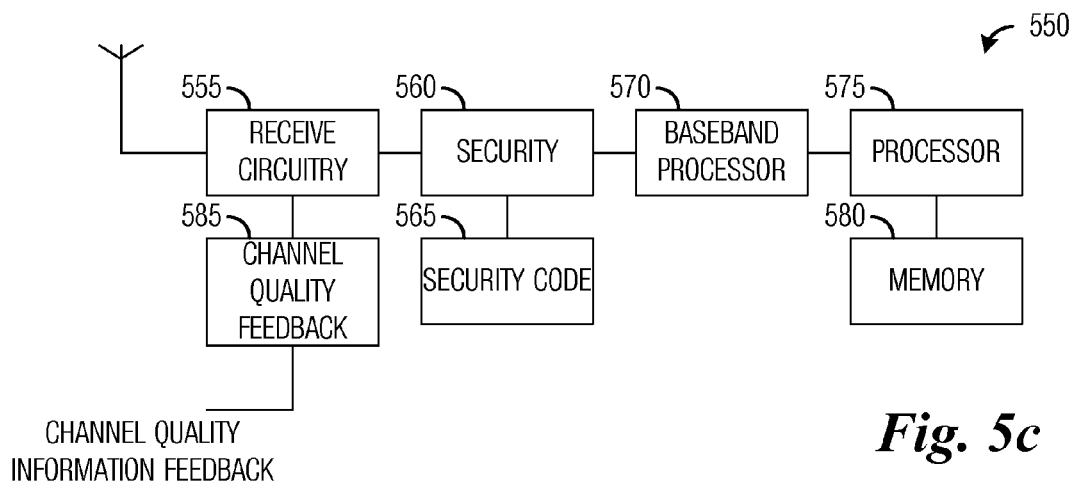
FIG. 5c is a diagram of a portion of a receiver with physical layer security.

FIG. 5c illustrates a portion of a receiver 550 with physical layer security. Information transmitted by a transmitter may be received by receiver 550 by way of an antenna(s). Receiver 550 receives signals of a secure transmission from the transmitter as a vector of received signals. Receiver 550 may continue to receive signals until L secure transmissions have been received, resulting in L vectors of received signals which correspond to a message. The vector of received signals may be provided to receive circuitry 555, which may process the received information.

According to an embodiment, receive circuitry 555 may wait until receiver 550 receives all L vectors of received signals of a message prior to proceeding with processing the received information. Alternatively, receive circuitry 555 may process each one of the L vectors of received signals as it is received, only stopping processing when reaching an operation that requires information contained in additional vectors of received signals of the message in order to proceed. Operations performed by receive circuitry 555 may include filtering, amplification, error detection and correction, modulation, analog-to-digital conversion, and so forth.

A security unit 560 decodes a secure message from the L vectors of received signals of the L secure transmissions, where the decoding makes use of a secrecy code comprising a first security code and a second security code. A security code store 565 may be used to store the first security code and the second security code. Security unit 560 may be used to convert (decode) the L vectors of received signals (after processing by receive circuitry 555) into estimates of L segments of coded bits. Each of the L segments of coded bits may have been secured by the transmitter using security embedding codes (or some other secrecy-capacity-achieving or non-secrecy-capacity-achieving codes, such as nested binning codes), i.e., the second security code discussed previously.

In other words, receiver 550 decodes a vector of received signals of a message into an estimate of a segment of coded bits using the second security code. Estimates of the L segments of coded bits may then be combined into an estimate of the intermediate secure codeword. The estimate of the intermediate secure codeword (decoded by security unit 560) may then be converted to an estimate of the original message using the first security code as discussed previously. The estimate of the original message may then be provided to a baseband processor 570 to provide final conversion into information that may be used by a processor 575. A memory 580 may be used to store the information, if necessary.

Corresponding to the second security code used in the transmitter, receiver 550 may generate an estimate of a segment of coded bits from a vector of received signals using a linear decoder. The receiver may also generate the estimate of the original message from the estimate of the intermediate secure codeword using a linear decoder corresponding to the first security code.

A channel quality feedback unit 585 may be used to provide information related to a communications channel between the transmitter and receiver 550, such as CSI, CQI, and so forth, back to the transmitter. In general, the channel quality feedback unit 585 transmits a feedback message to the transmitter, where the feedback message comprises a security indicator, and the security indicator provides channel quality information. The information related to the communications channel may assist in the securing of information transmitted by transmitter 500 to receiver 550 as well as improve overall data transmission performance.

Figures 1, 5D:
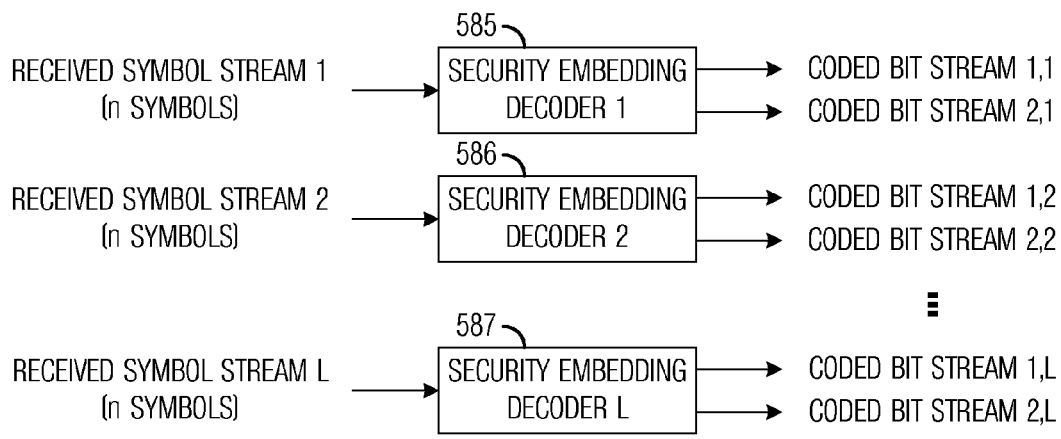
FIG. 5d is a diagram of a detailed view of a decoder with physical layer security.
Figures 2, 5D:
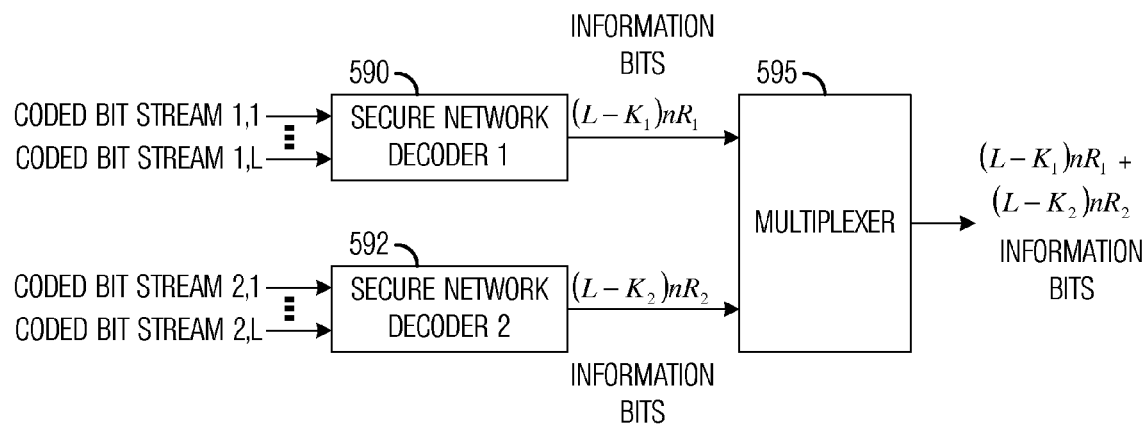

FIG. 5*d* illustrates a detailed view of a decoder with physical layer security. FIG. 5*d* may be illustrated as two parts, FIG. 5*d*-1 and FIG. 5*d*-2, with FIG. 5*d*-1 illustrating a detailed view of a first portion of the decoder and FIG. 5*d*-2 illustrating a detailed view of a second portion of the decoder.

As shown in FIG. 5*d*-1, the first portion of the decoder may decode L received symbol streams (n symbols each stream) into L*N streams of coded bits using L security embedding decoders, such as security embedding decoder 1 585, security embedding decoder 2 586, and security embedding decoder L 587, where N=2 in FIG. 5*d*-1.

As shown in FIG. 5*d*-2, the L*N streams of coded bits may be regrouped into L streams of N-bit streams each and provided to N secure network decoders, where in FIG. 5*d*-2, N=2 and secure network decoders include secure network decoder 1 590 and secure network decoder 2 592. Output from each secure network decoder (information bits) may be provided to a multiplexer 595 to combine the information bits back into a single information bit stream.

Figure 6A:
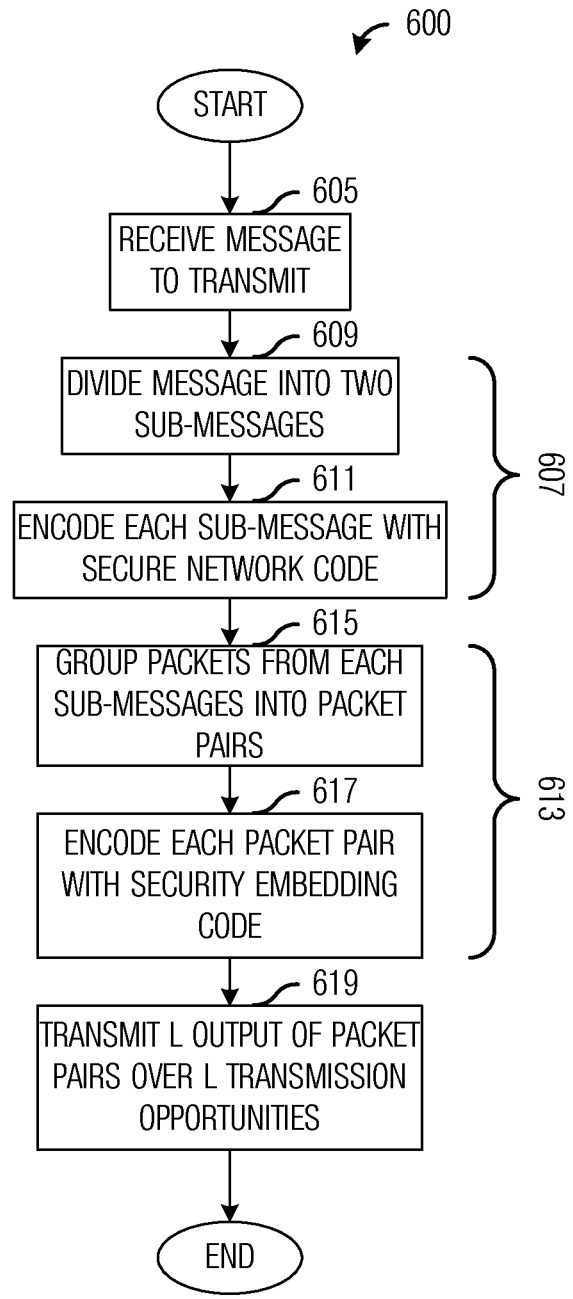
FIG. 6a is a flow diagram of transmitter operations in transmitting a secure message.

FIG. 6*a* illustrates a flow diagram of transmitter operations 600 in transmitting a secure message. Transmitter operations 600 may be indicative of operations occurring in a transmitter, such as a transmitter of a communications device or a communications controller, which is providing physical layer security to messages transmitted by the transmitter. Transmitter operations 600 may occur while the transmitter has messages to transmit and while the transmitter is operating in a normal operating mode.

Transmitter operations 600 may begin with the transmitter receiving a message to transmit (block 605). According to an embodiment, the message may be provided to the transmitter by an electronic device that contains the transmitter, an electronic device that is coupled to the transmitter, an application executing on the electronic device, a user of the electronic device, an information source coupled to the transmitter, a buffer in the transmitter containing messages to be transmitted, or so on.

The transmitter may then enter a multi-phase operation to provide security for the transmission of the message. A first phase 607 may include a securing of the message using a first security code, e.g., a secure network code. Securing the message using the first security code may include dividing the message into multiple sub-messages (block 609). Preferably, the message is divided into two sub-messages, e.g., first sub-message $M_1$ and second sub-message $M_2$. However, the embodiments may be operable for the division of the message into any number of sub-messages, such as two, three, four, five, and so forth. Therefore, the discussion of two sub-messages should not be construed as being limiting to either the spirit or the scope of the embodiments.

The two sub-messages ($M_1$ and $M_2$) may each be encoded with a secure network code (block 611). According to an embodiment, the first sub-message $M_1$ may be encoded with a first secure network code and the second sub-message $M_2$ may be encoded with a second secure network code. Both the first sub-message $M_1$ and the second sub-message $M_2$ may be encoded into L packets by their respective secure network codes. The first secure network code may preferably be a $K_1$-out-of-L secure network code and the second secure network code may preferably be a $K_2$-out-of-L secure network code, where $K_1 \leq K_2 \leq L$. Preferably, the first sub-message is secured with a weaker security code, i.e., the first secure network code is weaker than the second secure network code.

After being encoded with the first security code, a second phase 613 may involve the message being secured with a second security code, e.g., a security embedding code such as a nested binning code. Securing the message with the second security code may include grouping the packets of the first sub-message $M_1$ with the packets of the second sub-message $M_2$ into packet pairs, thereby producing L packet pairs of the form (packet_i_$M_1$, packet_i_$M_2$) where i=1, . . . , L (block 615).

Each of the L packet pairs may then be encoded using the second security code (block 617). According to an embodiment, the second security code is a security embedding code, such as a nested binning code. According to another embodiment, a packet of a packet pair that is from the first sub-message $M_1$ may be treated as a high-security message and a packet of the packet pair that is from the second sub-message $M_2$ may be treated as a low-security message. A combination of encoding the first sub-message $M_1$ with a weaker first security code and then treating it as the high-security message and encoding the second sub-message $M_2$ with a stronger first security code and then treating it as the low-security security helps to balance out an overall security of the message.

Although the discussion focuses on encoding the first sub-message $M_1$ with the weaker first security code and then treating it as the high-security message, the embodiments are operable with other possible combinations, such as encoding the first sub-message $M_1$ with the weaker first security code and then treating it as the low-security message, encoding the first sub-message $M_1$ with the stronger second security code and then treating it as the high-security message, encoding the first sub-message $M_1$ with the stronger second security code and then treating it as the low-security message, and so forth. Therefore, the discussion presented herein should not be construed as being limiting to either the scope or the spirit of the embodiments.

After encoding the L packet pairs with the second security code, thereby producing L output packets, the transmitter may transmit the L output packets over L consecutive transmission opportunities (block 619). As discussed previously, a transmission opportunity may be defined as when a channel gain of the legitimate receiver channel exceeds the threshold τ. Transmitter operations 600 may then terminate.

Figures 6B, 6C:
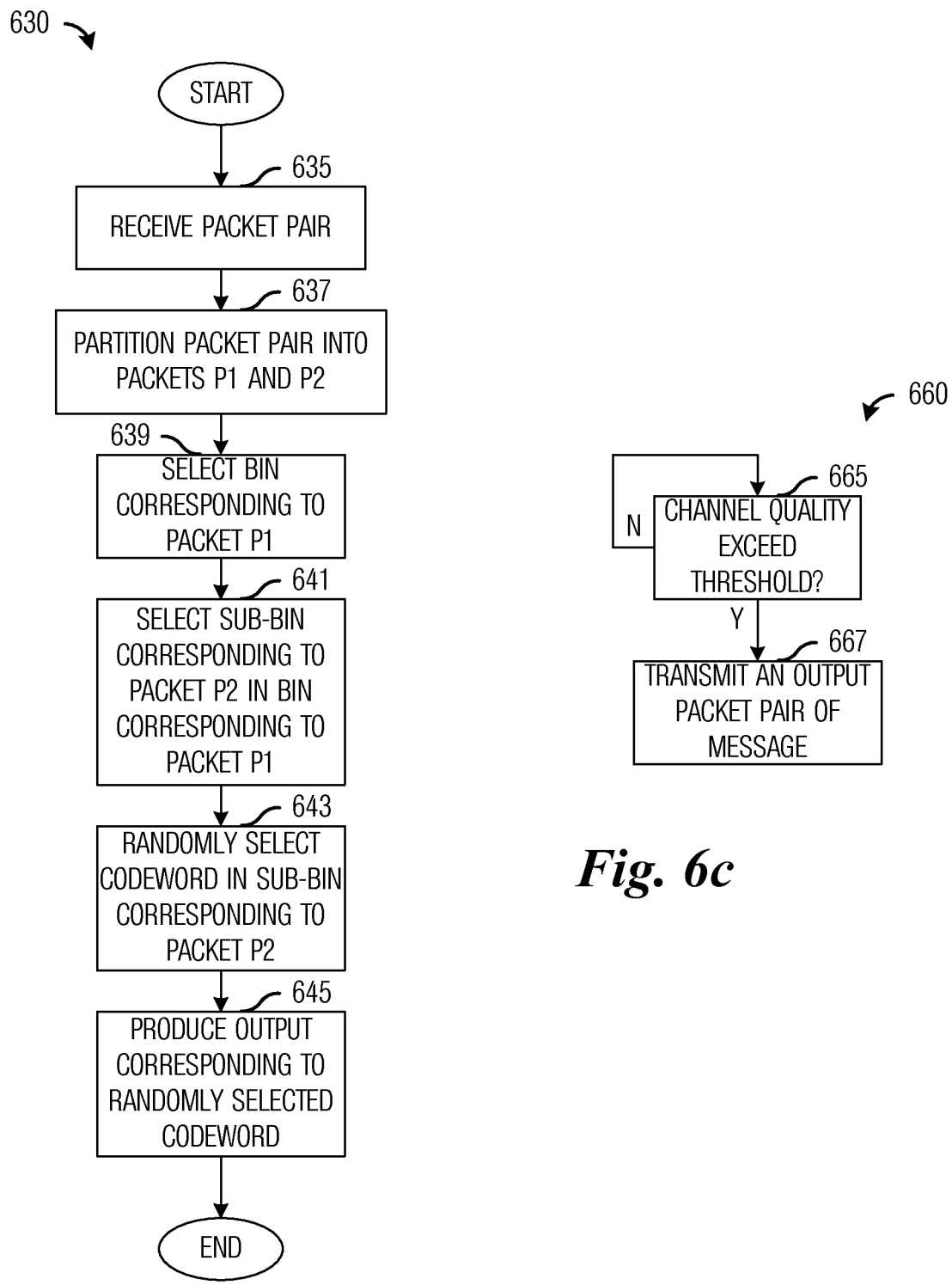
FIG. 6b is a flow diagram of transmitter operations in the encoding a packet pair with a second security code.
FIG. 6c is a flow diagram of transmitter operations in transmitting the L output codewords of the secure message.

FIG. 6b illustrates a flow diagram of transmitter operations 630 in the encoding a packet pair with the second security code. Transmitter operations 630 may be an implementation of block 617 of FIG. 6a, encoding each of the L packet pairs with the second security code. Transmitter operations 630 may be indicative of operations occurring in a transmitter as the transmitter provides physical layer security for messages transmitted by the transmitter. Transmitter operations 630 may occur while the transmitter has information to transmit and while the transmitter is in a normal operation mode.

Transmitter operations 630 may begin with the transmitter receiving a packet pair (block 635). As described previously, the packet pair comprises a packet from the first sub-message $M_1$ and a packet from the second sub-message $M_2$. The packet pair may be partitioned (separated) into two packets, $P_1$ and $P_2$, wherein packet $P_1$ may be the packet from the first sub-message $M_1$ and packet $P_2$ may be the packet from the second sub-message $M_2$ (block 637).

For discussion purposes, let the second security code be a nested binning code, although other security embedding codes may be used. As described previously, the first sub-message $M_1$ may be treated as the high-security message and may be used to select a first level bin. A first level bin that corresponds to the packet $P_1$ may be selected (block 639). Then, a sub-bin in the selected first level bin may be selected, wherein the sub-bin correspond to the packet $P_2$ (block 641). A codeword in the selected sub-bin may be randomly selected (block 643). The randomly selected codeword may be an encoded output corresponding to the packet pair and may be transmitted by the transmitter at a transmission opportunity (block 645). Transmitter operations 630 may then terminate.

FIG. 6c illustrates a flow diagram of transmitter operations 660 in transmitting the L output codewords of the secure message. Transmitter operations 660 may begin with the transmitter performing a check to determine if the channel gain satisfies a criterion, e.g., the channel gain (quality) exceeds the threshold τ (block 665). According to an embodiment, the transmitter may determine if the channel gain exceeds the threshold τ by using feedback information provided by the legitimate receiver. For example, the legitimate receiver may feedback information that is explicitly used for security. The explicit security feedback may be as simple as a one-bit value regarding the channel quality. The legitimate receiver may feedback to the transmitter a "1" to indicate that the channel quality is greater than the threshold τ and a "0" to indicate that the channel quality is not greater than the threshold τ. If the channel quality exceeds the threshold τ, one of the L output codewords of the secure message may be transmitted (block 667). Transmitter operations 660 may then terminate.

According to an alternative embodiment, the transmitter may use feedback intended for other uses for security purposes. For example, in a 3GPP LTE compliant communications system, a channel quality indicator (CQI) may be fed-back by user equipment (UE) periodically or aperiodically to an eNB (a communications controller containing the transmitter) so that the eNB may make scheduling decisions. The CQI may also be utilized by the eNB to make a judgment similar to determining if the channel quality exceeds the threshold τ. As an example, the eNB may send a secure message only if the CQI is above a certain level.

According to another alternative embodiment, the transmitter may make use of implicit channel knowledge to determine if the channel quality exceeds the threshold. For example, channel quality knowledge may be available to the transmitter without feedback. In a time division duplexed (TDD) communications system, the eNB may be able to estimate the channel quality of a downlink channel based on an uplink sounding signal transmitted to the eNB by the legitimate receiver, taking advantage of channel reciprocity, for example.

Figure 7A:
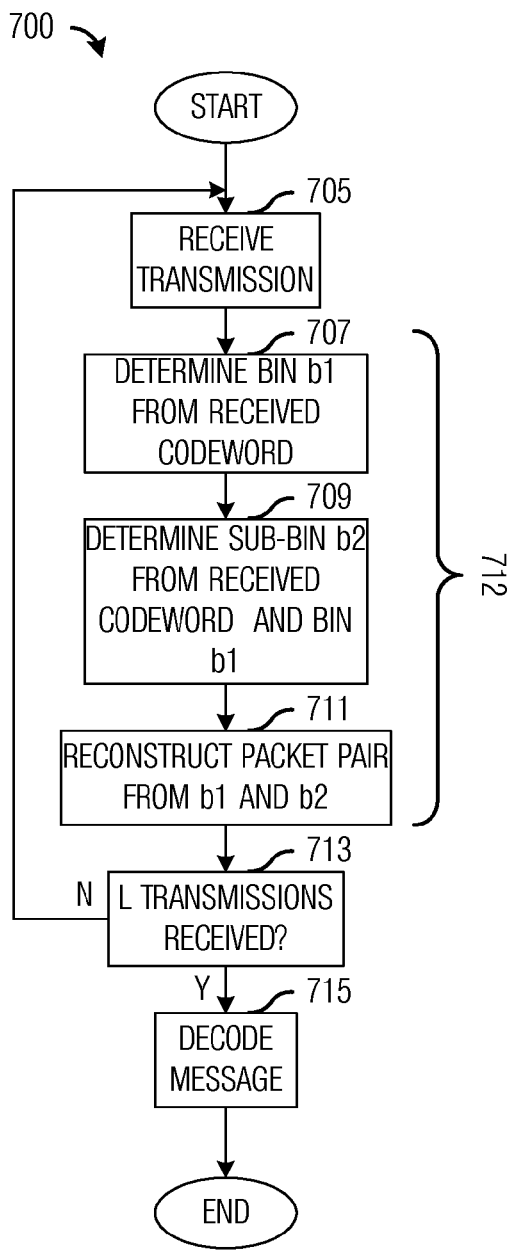
FIG. 7a is a flow diagram of receiver operations in receiving secured messages from a transmitter providing physical layer security.

FIG. 7a illustrates a flow diagram of receiver operations 700 in receiving secured messages from a transmitter providing physical layer security. Receiver operations 700 may be indicative of operations taking place in a receiver as the receiver receives a secured message(s) from a transmitter. The secured message(s) received by the receiver may be secured with a multi-phase security operation wherein the message is secured by a first security code and a second security code, wherein the first security code may be a secure network code and the second security code may be a security embedding code, such as a nested binning code. Receiver operations 700 may occur while the receiver is in a normal operating mode.

Receiver operations 700 may begin with the receiver receiving a transmitted codeword transmitted by the transmitter (block 705). The received codeword may be a contaminated (by communications channel noise, for example) version of a codeword generated from a packet pair ($P_1$, $P_2$) where packet $P_1$ is selected from the first sub-message $M_1$ after being encoded by the first security code and packet $P_2$ from the second sub-message $M_2$ after being encoded by the first security code, where the first sub-message $M_1$ and the second sub-message $M_2$ are parts of a transmitted by the transmitter to the receiver. If there is no communications channel noise (or other noise), for example, then the received codeword may be equal to the codeword generated from the packet pair ($P_1$, $P_2$).

Using the received codeword, the receiver may determine a bin b1 corresponding to packet $P_1$ (block 707). The receiver may determine an identifier of the bin corresponding to packet $P_1$. For example, the identifier may be an index to the bin. Alternatively, the identifier may be the bit vector value of packet $P_1$. The receiver may make use of a nested binning code generating equation or expression to determine the identifier of the bin corresponding to packet $P_1$. For example, the nested binning code generating equation or expression may be used to dynamically generate codewords that may be compared with the received codeword to find the identifier of the bin corresponding to packet $P_1$. The nested binning code generating equation or expression used by the receiver may be the same nested binning code generating equation or expression used by a transmitter to generate the transmitted codeword.

Then, using the bin b1 corresponding to packet $P_1$ and the received codeword, the receiver may determine a sub-bin b2 corresponding to packet $P_2$ (block 709). The receiver may determine an identifier of the sub-bin corresponding to packet $P_2$. For example, the identifier may be an index to the sub-bin. Alternatively, the identifier may be the bit vector value of packet $P_2$. The receiver may make use of a nested binning code generating equation or expression to determine the identifier of the sub-bin corresponding to packet $P_2$. For example, the nested binning code generating equation or expression may be used to dynamically generate codewords that may be compared with the received codeword to find the identifier of the sub-bin corresponding to packet $P_2$. The nested binning code generating equation or expression used by the receiver may be the same nested binning code generating equation or expression used by a transmitter to generate the transmitted codeword.

Alternatively, determining the identifiers of the bin and the sub-bin may involve searching through a list of possible codewords. For example, the list of possible codewords may include possible codewords generated by the nested binning codes and identifiers of bins and sub-bins associated with each possible codeword. Using the identifiers of the bin b1 and the sub-bin b2 determined from the received codeword, the receiver may reconstruct the packet pair (P$_1$, P$_2$) (block 711).

Collectively, determining bin b1 and sub-bin b2 and reconstructing the packet pair from bin b1 and sub-bin b2 may be referred to as reconstructing a segment of coded bits (shown as span 712). As used herein, a segment coded bits may correspond to one of L packets of the first sub-message M$_1$ and the second sub-message M$_2$ after they have been encoded with the first security code.

The receiver may perform a check to determine if it has received L transmissions (codewords) (block 713). If the receiver has not received L transmissions, then the receiver may return to block 705 to receive additional transmissions. If the receiver has received L transmissions, then the receiver may decode the message from the L packet pairs (block 715). According to an embodiment, the receiver may decode the message from the L packet pairs by decoding the L packet pairs using an inverse of the first security code used to encode the packets of the L packet pairs. For example, for the first sub-message M$_1$, the receiver may use an inverse of the K$_1$-out-of-L first security code and for the second sub-message M$_2$, the receiver may use an inverse of the K$_2$-out-of-L first security code. Receiver operations 700 may then terminate.

Figure 7B:
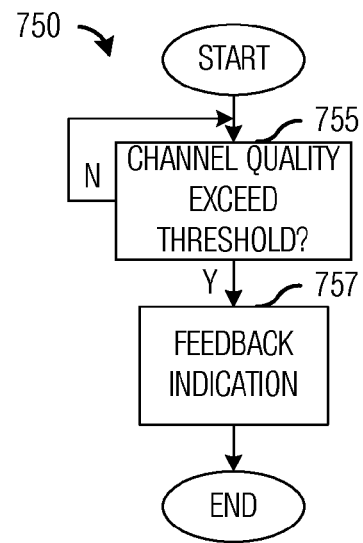
FIG. 7b is a flow diagram of receiver operations in providing channel quality information to a transmitter.

FIG. 7b illustrates a flow diagram of receiver operations 750 in providing channel quality information to a transmitter. Receiver operations 750 may be indicative of operations occurring in a receiver as the receiver provides channel quality information to a transmitter. Receiver operations 750 may occur while the receiver is in a normal operating mode and while the transmitter has secure messages to transmit to the receiver.

Receiver operations 750 may begin with the receiver performing a check to determine if the channel quality exceeds a threshold (block 755). For example, the receiver may check to determine if the channel gain exceeds the threshold. If the channel quality does not exceed the threshold, then the receiver may return to block 755 to repeat the check. If the channel quality does exceed the threshold, then the receiver may feedback an indicator to the transmitter; the indicator indicating that the channel quality does exceed the threshold (block 757).

The indicator may be feedback in a feedback message specifically intended for security use or the indicator may be included along with or combined with other feedback information. Receiver operations 750 may then terminate.

According to an alternative embodiment, the receiver feedbacks an indicator indicating the channel quality regardless of whether the channel feedback exceeds the threshold or not. For example, the indicator may be set to a first value to indicate that the channel quality exceeds the threshold and the indicator may be set to a second value to indicate that the channel quality does not exceed the threshold.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting a message, the method comprising:
    partitioning the message into N sub-messages, where N is a positive integer value greater than or equal to two;
    encoding the N sub-messages into a plurality of packet groups with a first security code, wherein the first security code comprises a secure network code;
    encoding all of the plurality of packet groups into a plurality of output packets with a second security code, wherein the second security code is a nested binning code; and
    transmitting the plurality of output packets.

2. The method of claim 1, wherein transmitting the plurality of output packets comprises:
    transmitting one of the output packets of the plurality of output packets from a transmitter to a communications device in response to determining that a channel quality of a channel between the transmitter and the communications device satisfies a criterion; and
    repeating the transmitting for any remaining output packets in the plurality of output packets.

3. The method of claim 2, wherein the criterion comprises a quality of the channel exceeds a threshold.

4. The method of claim 1, wherein each sub-message is encoded into at least L packets with the first security code, where L is a positive integer value.

5. The method of claim 4, wherein the secure network code has parameters (K, L), wherein parameter K indicates a level of redundancy added by the secure network code, and parameter L is a number of packets generated by the secure network code after encoding a sub-message.

6. The method of claim 5, wherein sub-messages i and j are encoded with secure network codes of parameters (K$_i$, L) and (K$_j$, L), respectively, wherein K$_i$≤K$_j$, where i and j are indices of positive integer values and i≠j.

7. The method of claim 4, wherein encoding the N sub-messages into a plurality of packet groups comprises generating an m-th packet group by selecting an m-th packet from each of the N encoded sub-messages, where m is a positive integer value less than or equal to L.

8. The method of claim 1, wherein N is equal to two.

9. The method of claim 8, wherein the encoding the plurality of packet groups into a plurality of output packets with a second security code comprises:
    selecting a packet group from the plurality of packet groups;
    selecting a bin of codewords from a plurality of codewords, wherein the bin of codewords containing a plurality of sub-bins of codewords, and wherein the selecting is based on a first packet in the selected packet group;
    selecting a sub-bin of codewords from the plurality of sub-bins of codewords based on a second packet in the selected packet group;
    selecting a codeword from the sub-bin of codewords; and
    repeating the selecting a packet group, the selecting a bin of codewords, the selecting a sub-bin of codewords, and the selecting a codeword for any remaining packet group in the plurality of packet groups.

10. The method of claim 9, wherein the first packet is encoded with a lower strength first security code, and wherein the second packet is encoded with a higher strength first security code.

11. A method for receiving a message, the method comprising:
- receiving a secure transmission that includes L vectors of received signals, where L is an integer greater than one;
- generating an intermediate secure codeword from each vector of received signals in the L vectors of received signals using a second security code, wherein the second security code is a nested binning code, thereby producing a plurality of intermediate secure codewords; and
- reconstructing the message from all of the plurality of intermediate secure codewords, wherein the reconstructing is based on a first security code, wherein the first security code comprises a secure network code.

12. The method of claim 11, wherein reconstructing the message from the plurality of intermediate secure codewords comprises:
- reconstructing N vector groups from the plurality of intermediate secure codewords, where N is a positive integer; and
- generating the message from the N vector groups.

13. The method of claim 12, wherein reconstructing N vector groups comprises:
- selecting an i-th code segment from each intermediate secure codeword from the plurality of intermediate secure codewords, where i is an integer value and $1 \leq i \leq N$;
- combining the i-th code segment from each intermediate secure codeword from the plurality of intermediate codewords into an i-th vector group; and
- repeating the selecting an i-th code segment and the combining the i-th code segment for each remaining N−1 vector groups.

14. The method of claim 12, wherein generating the message from the N vector groups comprises:
- decoding an i-th vector group with an i-th first security code, thereby producing an i-th estimated sub-message, where i is an integer value, $1 \leq i \leq N$;
- repeating the decoding for each vector group in the N vector groups; and
- concatenating the N estimated sub-message to produce the message.

15. The method of claim 11, wherein generating an intermediate secure codeword comprises for each vector of received signals:
- determining identifiers to each packet in a packet group based on the vector of received signals; and
- reconstructing each packet in the packet group based on the identifiers, wherein the packet group is the intermediate secure codeword.

16. The method of claim 15, wherein each packet group comprises two packets, and wherein determining identifiers to each packet in a packet group based on the vector of received signals comprises:
- determining a sub-bin identifier to a sub-bin of codewords within a bin of codewords based on the vector of received signals; and
- determining a bin identifier to a bin of codewords based on the vector of received signals.

17. The method of claim 16, wherein the second security code comprises a nested binning code, and wherein determining a sub-bin identifier comprises:
- generating codewords with a nested binning code structure;
- selecting a generated codeword that most closely matches the vector of received signals; and
- setting a sub-bin identifier associated with the generated codeword as the sub-bin identifier.

18. The method of claim 17, wherein determining a bin identifier comprises setting a bin identifier associated with the generated codeword as the bin identifier.

19. A transmitter comprising:
- a scheduler coupled to a message input, the scheduler configured to arrange a timing of transmission of messages to a receiver;
- a security unit coupled to the scheduler, the security unit configured to secure a message provided by the scheduler by generating L output codewords from the message using a secure network code and a security embedding code, wherein the security embedding code is a nested binning code, wherein the message is partitioned into at least two sub-messages before encoding, wherein the secure network code is used to encode the at least two sub-messages, and wherein the security embedding code is used to encode an entire output produced by encoding the at least two sub-messages with the secure network code;
- a security code store coupled to the security unit, the secure code store configured to store the secure network code and the security embedding code; and
- a transmit circuit coupled to the security unit, the transmit circuit configured to prepare the L output codewords for transmission.

20. The transmitter of claim 19, wherein the scheduler is configured to schedule a transmission of an output codeword when a channel quality exceeds a threshold.

21. The transmitter of claim 19, wherein the security unit secures the message by encoding separately a first sub-message and a second sub-message with the secure network code to produce intermediate secure codewords and then encoding the intermediate secure codewords with the security embedding code to produce the L output codewords.

* * * * *